(12) United States Patent
Cras et al.

(10) Patent No.: US 8,572,122 B2
(45) Date of Patent: Oct. 29, 2013

(54) DATA SCHEMA AND LANGUAGE

(75) Inventors: Jean-Yves Cras, Paris (FR); Bogdan Marinoiu, Courbevoie (FR); Gilles Vergnory-Mion, Vaucresson (FR); Yann Le Biannic, Suresnes (FR)

(73) Assignee: SAP AG, Walldorf (DE)

( * ) Notice: Subject to any disclaimer, the term of this patent is extended or adjusted under 35 U.S.C. 154(b) by 33 days.

(21) Appl. No.: 13/340,179

(22) Filed: Dec. 29, 2011

(65) Prior Publication Data

US 2013/0173591 A1 Jul. 4, 2013

(51) Int. Cl.
*G06F 17/30* (2006.01)

(52) U.S. Cl.
USPC ............ 707/791; 707/802; 707/822; 707/828

(58) Field of Classification Search
USPC .................................................. 707/600–899
See application file for complete search history.

(56) References Cited

U.S. PATENT DOCUMENTS

2011/0295865 A1* 12/2011 Carroll et al. ................. 707/756

* cited by examiner

*Primary Examiner* — Isaac M Woo
(74) *Attorney, Agent, or Firm* — Buckley, Maschoff & Talwalkar LLC

(57) ABSTRACT

A system includes reception of a logical schema associated with a data store, generation of an input schema based on the logical schema, reception of an expression having a type of the input schema and representing the topology of a data set, the data set being an instance of the input schema, compilation of the expression to a data specification based on the input schema, and generation of a plan to execute on the data store based on the data specification.

15 Claims, 8 Drawing Sheets

DATA SCHEMA AND LANGUAGE

BACKGROUND

Query languages such as Structured Query Language (SQL) are particularly suited for retrieval of data from datastores, regardless of the schema of the data. However, SQL is not suited to data analysis, as it lacks the expressiveness to specify complex, high-level calculations. For example, SQL provides calculation of only one table at a time and lacks constructs such as calculated members, join abstraction, and abstraction of aggregation functions.

In contrast, Multi-Dimensional eXpressions (MDX) is a language providing multi-dimensional analytical queries including calculated measures, calculated members, hierarchical navigation support, and heterogeneous member sets. MDX is therefore commonly used to provide advanced analysis.

MDX, however, requires an underlying multi-dimensional model (i.e., a Cube) which must be authored so as to conform to particular structural requirements. Typically, a Cube represents a set of independent coordinates in an N-dimensional space, each point of which contains a scalar value (i.e., string or numeral). MDX allows programmers to specify sets of coordinates in this space and to retrieve the values corresponding to the coordinates.

Authoring a Cube on top of, for instance, the transactional data model of an application is a relatively costly design task which forces designers to make compromises. For instance, a designer must typically determine a default hierarchy to navigate each dimension of a Cube. Also, all dimensions in a Cube must be orthogonal, so any relations which exist between dimensions in the original schema are lost after the original schema is projected onto a Cube schema.

Data analysis often requires the specification of complex pieces of data, such as an entire report or a dashboard, that can only be materialized in a complex database schema containing, for instance, multiple fact tables sharing some but not all dimension tables. However, SQL, MDX, and other existing query languages for query and analysis are limited in regards to the "shape" of the data sets that a query can return. An SQL SELECT statement, however complex, always computes a single table. Similarly, an MDX statement always brings back a "cube slice" or star schema that includes only one fact table with foreign keys to zero or more independent dimension tables.

Therefore, if a report or dashboard requires more than the above-described simple data topologies, multiple queries to the underlying system must be issued. Then, the client application must reconcile the data returned by the multiple queries, which may involve additional data processing. Consequently, the atomicity of the read transaction is not guaranteed.

DETAILED DESCRIPTION

The following description is provided to enable any person in the art to make and use the described embodiments. Various modifications, however, will remain readily apparent to those in the art.

Figure 1:
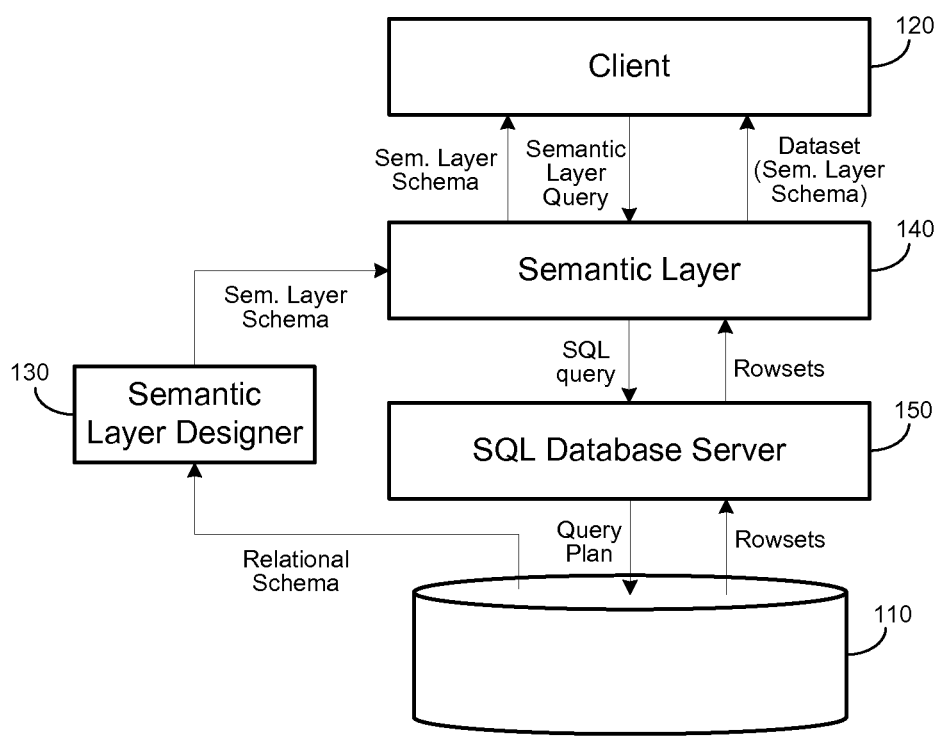
FIG. 1 is a block diagram of a system.

FIG. 1 is a block diagram of system 100 as is known in the art. System 100 may operate to provide data from data store 110 to client 120, and is described herein to provide contrast with the operation of some embodiments.

As illustrated, semantic layer designer 130 determines the relational schema of data stored in data store 110. Semantic layer designer 130 maps logical entities of the relational schema to a set of abstract entities known as business objects. The business objects and their mappings comprise a semantic layer schema, which is defined in metadata of semantic layer 140.

The business objects may represent business entities, such as customers, time periods, financial figures, etc. Business objects may be classified as dimensions along which one may want to perform an analysis or report (e.g., Year, Country, Product), details (additional information on dimensions, e.g., Address of a Customer or Description of a Product), and measures (e.g., Sales, Profit) whose values can be determined for a given combination of dimension values.

Client 120 comprises a computing device executing a front-end software application providing reporting, planning and/or analytics. Client 120 receives the semantic layer schema and generates semantic layer queries based on the business objects of the semantic layer schema. The semantic layer schema therefore facilitates the retrieval of data from data store 110 without requiring reference to specific physical entities (tables, rows, etc.) of data store 110.

Semantic layer 140 receives a semantic layer query from client 120 and creates a corresponding SQL query based on the mappings which bind the semantic layer schema to the logical entities of the relational schema of data store 110. SQL database server 150 receives the corresponding SQL query and, based on its knowledge of the relational schema and its underlying physical entities, creates a query plan to be executed by data store 110.

Data store 110 executes the query plan and returns corresponding rowsets (i.e., data). Semantic layer 140 receives the rowsets, formats the included data based on the semantic layer schema, and provides the thusly-formatted dataset to client 120.

Figure 2:
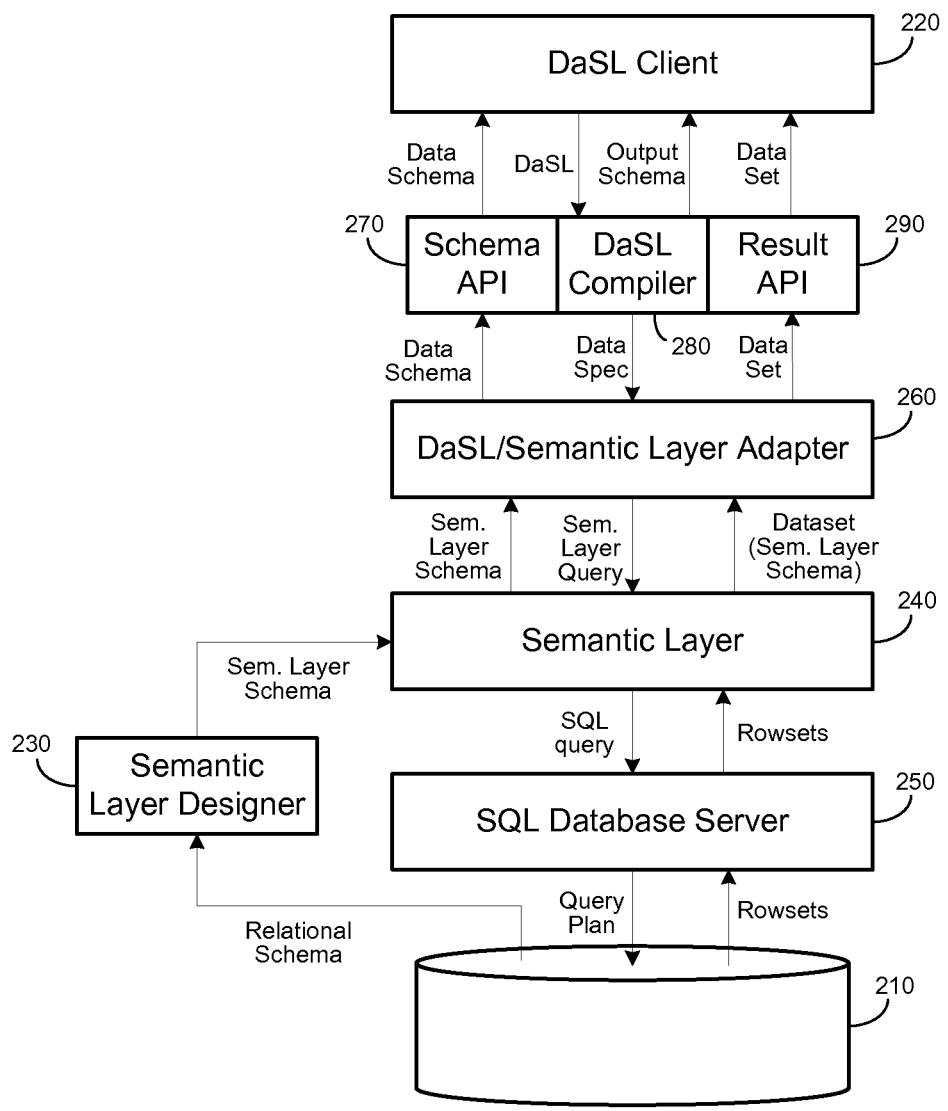
FIG. 2 is a block diagram of a system according to some embodiments.

FIG. 2 is a block diagram of system 200 according to some embodiments. System 200 may operate to provide data from data store 210 to client 220.

As mentioned with respect to FIG. 1, semantic layer designer 230 maps logical entities of data store 210 to objects (e.g., business objects) of semantic layer 240. Unlike system 100, adapter 260 generates a Data Schema based on the semantic layer schema. The Data Schema of the present embodiments will be described in greater detail below.

Data Specification Language (DaSL) client 220 comprises a computing device executing a front-end software application providing reporting, planning and/or analytics. Client 220 receives the Data Schema via schema application programming interface (API) 270. Based on the Data Schema, client 220 creates a DaSL expression describing desired data of data store 210.

DaSL compiler 280 generates a data specification based on the DaSL expression and returns the data specification to adapter 260. DaSL compiler 280 also generates an output schema/data set topology based on the DaSL expression and returns the output schema to client 220. Notably, the generated data specification and the output schema are instances of the Data Schema according to some embodiments.

Adapter 260 generates zero, one, or more semantic layer queries based on the data specification and on known relationships between the Data Schema and the semantic layer schema. Semantic layer 240 receives the semantic layer query and creates zero, one, or more corresponding SQL queries based on the mappings which bind the semantic layer schema to the logical entities of the relational schema of data store 210. SQL database server 250 receives the SQL query and creates a query plan.

Data store 210 executes the query plan and returns rowsets (i.e., data) to SQL database server 250. Semantic layer 240 receives the rowsets therefrom, formats the included data based on the semantic layer schema, and provides the formatted dataset to adapter 260. Adapter 260 creates a data set which is also an instance of the data schema. DaSL client 220 invokes result API 290 to retrieve the data set, and then formats the data set based on the output schema previously received from DaSL compiler 280.

In contrast to system 200, conventional query languages require one set of expression statements to author a schema and a second set of expression statements to query on the schema. For instance, the Data Description Language of SQL is used to author an SQL database, and MDX Script is used to create an MDX Cube. Advantageously, some embodiments of system 200 use the same language to define the Data Schema and to create a DaSL expression.

Embodiments are not limited to relational schemas as described in the example of system 200. The schema of the underlying data store could be relational, multi-dimensional or another type, and a Data Schema may be generated therefrom for use by an adapter, compiler and client as described above. In this regard, elements 230 through 250 provide adapter 260 with metadata binding the Data Schema to logical entities of the underlying logical schema of data store 210; these elements are not required if the bindings are otherwise available to adapter 260.

Figure 3:
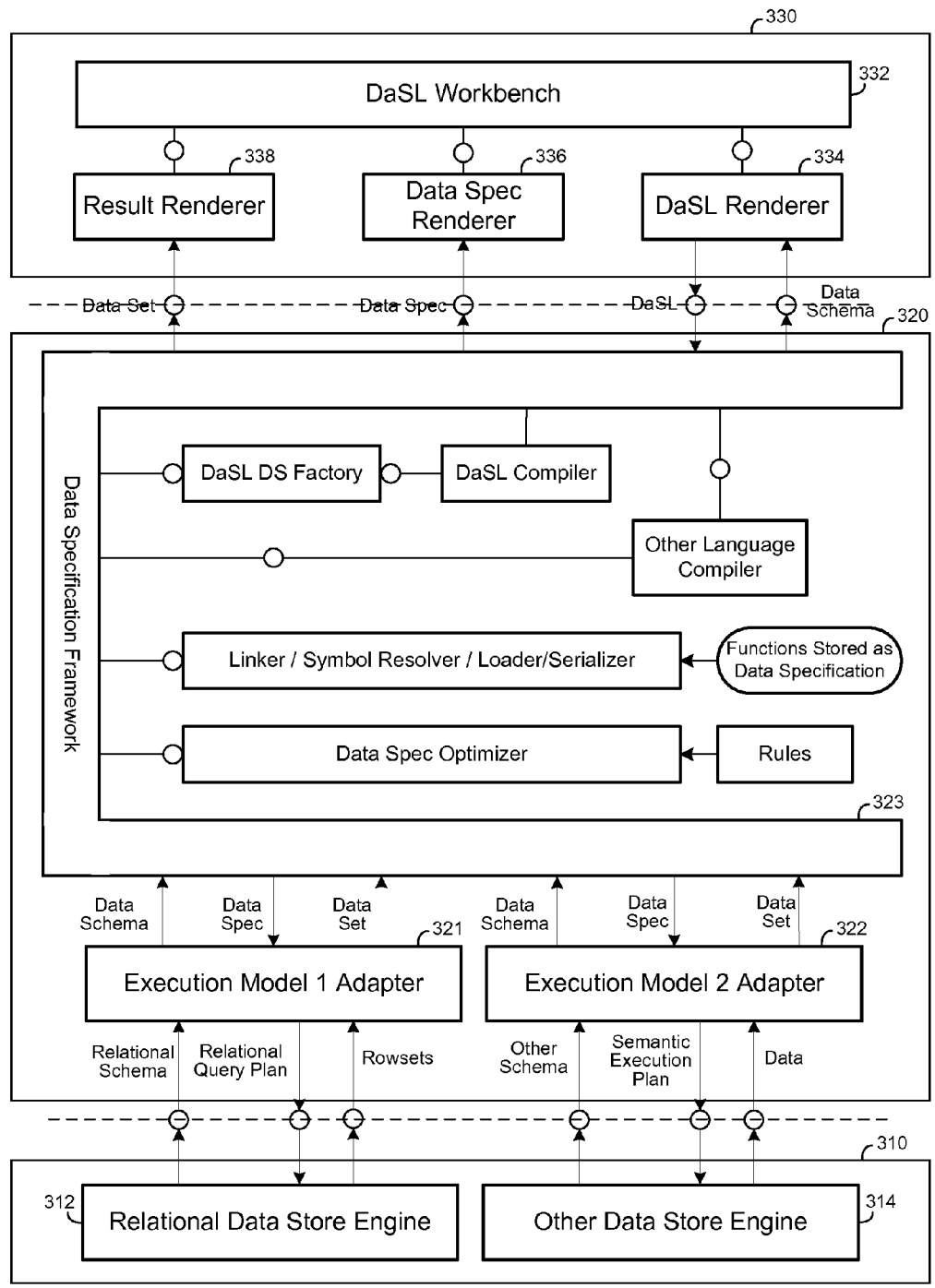
FIG. 3 is a block diagram of a system according to some embodiments.

FIG. 3 provides a more detailed block diagram of system 300 according to some embodiments. System 300 provides data of two different data stores 310, neither of which is limited to an SQL implementation.

Execution model 1 adapter 321 of application server 320 may implement the functionality ascribed above to SQL database server 250, semantic layer 240 and adapter 260, although not limited to the SQL language. As such, adapter 321 may generate a Data Schema based on a relational schema of relational data store engine 312 and may generate a relational query plan based on a data specification received from data specification framework 323. Moreover, adapter 321 receives rowsets from relational data store engine 312 in response to such a relational query plan and provides a data set, which is an instance of the Data Schema, to data specification framework 323.

Execution model 2 adapter 322 operates similarly to adapter 321 but with respect to other data store engine 314. Other data store engine 314 may conform to any type of schema or execution engine. Adapter 322 may generate a second Data Schema based on this schema and may generate a semantic execution plan based on a second data specification received from data specification framework 323. The second Data Schema differs from the Data Schema generated by adapter 321, and the second data specification is an instance of the second Data Schema. Adapter 322 receives data from other data store engine 314 in response to a semantic execution plan and provides a corresponding data set, which is also an instance of the second Data Schema, to data specification framework 323.

Data specification framework 323 compiles DaSL expressions received from front-end 330 to data specifications based on a particular Data Schema, as well as other optimization tasks. Embodiments are not limited to DaSL expressions as described herein. Accordingly, data specification framework 323 also compiles queries expressed in other languages to data specifications based on a particular Data Schema.

DaSL workbench 332 of front-end 330 may utilize DaSL renderer 334 to receive a generate DaSL expression and generate a Data Schema and based thereon. In this regard, a type of the DaSL expression is itself a Data Schema. Data spec renderer 336 receives data specifications compiled based on these Data Schemas and operates in conjunction with result renderer 338 to render a received data set based on a corresponding compiled data specification.

Figure 4:
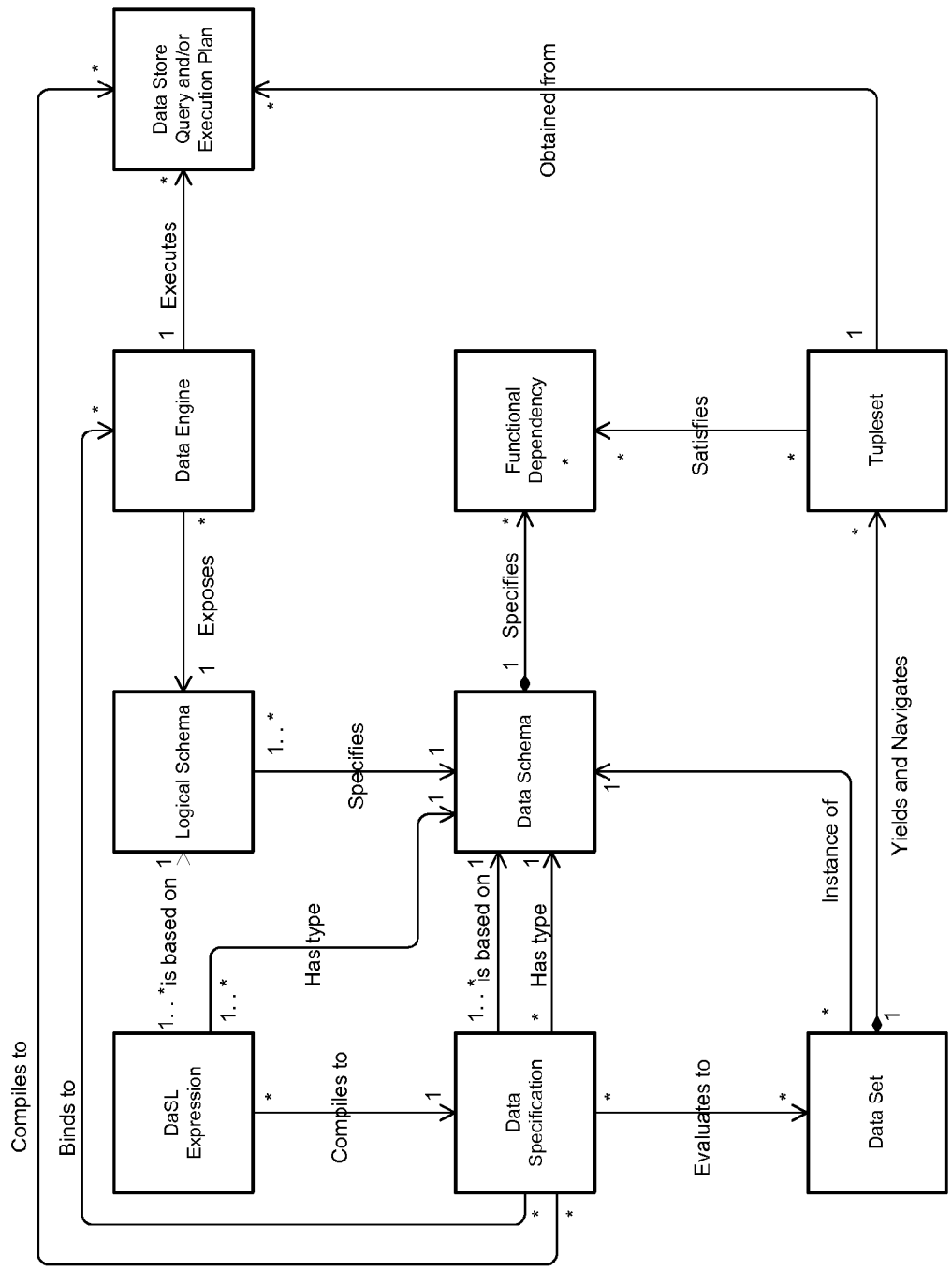
FIG. 4 is a Unified Modeling Language diagram according to some embodiments.

FIG. 4 illustrates logical relationships between several of the above-mentioned entities according to some embodiments. As described, a Data Engine of a data store executes a Query and/or Execution plan and also exposes a Logical Schema of the data store. The Logical Schema specifies a Data Schema. Moreover, a DaSL Expression is based on the Logical Schema and a type of the DaSL Expression is a Data Schema. The DaSL Expression compiles to a Data Specification, which is an instance of the Data Schema.

The Data Specification binds to the Data Engine and further compiles to zero, one or more Query and/or Execution plans. Moreover, the Data Specification evaluates to a Data Set, which is an instance of the Data Schema. The Data Set also yields and navigates a Tupleset, which in turn satisfies a Functional Dependency specified by the Data Schema and is obtained from the Query and/or Execution Plan. FIG. 4 follows the architecture of FIG. 3, however, with reference to FIG. 2, a semantic layer may be considered as the Logical Schema of FIG. 4, with the Data Engine including elements 240 and 250 of system 200.

The Data Schema mentioned above identifies what can be queried or computed using a DaSL expression. The Data Schema is expressed in metadata and will alternatively be referred to below as an input schema. An input schema according to some embodiments may be mapped on top of an arbitrary data source, regardless of how the data source stores information or of the type of queries the data source can support.

An input schema according to some embodiments is a set of attributes related by dependencies. An attribute is an arbitrary name that represents some business entity or value, such as Customer, Revenue, Order Line or Geography. An attribute can be associated to a set of values. A DaSL expression computes sets of values for some attributes, sometimes taking into account the values for some other attributes. A set of values for an attribute may be empty, may contain only one element, or may contain an arbitrary set of values. A scalar attribute is an attribute which has a set of values containing at most one element.

A dependency represents a relation or constraint that holds between the sets of values for the attributes that it relates. A DaSL expression combines the dependencies exposed by the input schema to determine the calculations that are performed on its attributes.

Each attribute involved in a dependency has a specific role in the dependency, and this role is described by an axis. An axis of a dependency refers to an attribute, and describes how the dependency influences and/or is influenced by sets of values for the attribute. More specifically, for a given dependency, an attribute can be an input, an output, or both. This property is called the axis orientation. An attribute can be a scalar or set input, and, independently, a scalar or set output of a dependency. This property is called the axis cardinality.

If a dependency includes a scalar output axis, then, if all its scalar input axes are connected to scalar attributes, the output attribute is also scalar. A dependency having a scalar output axis and no scalar input always has a scalar output attribute.

Figure 5:
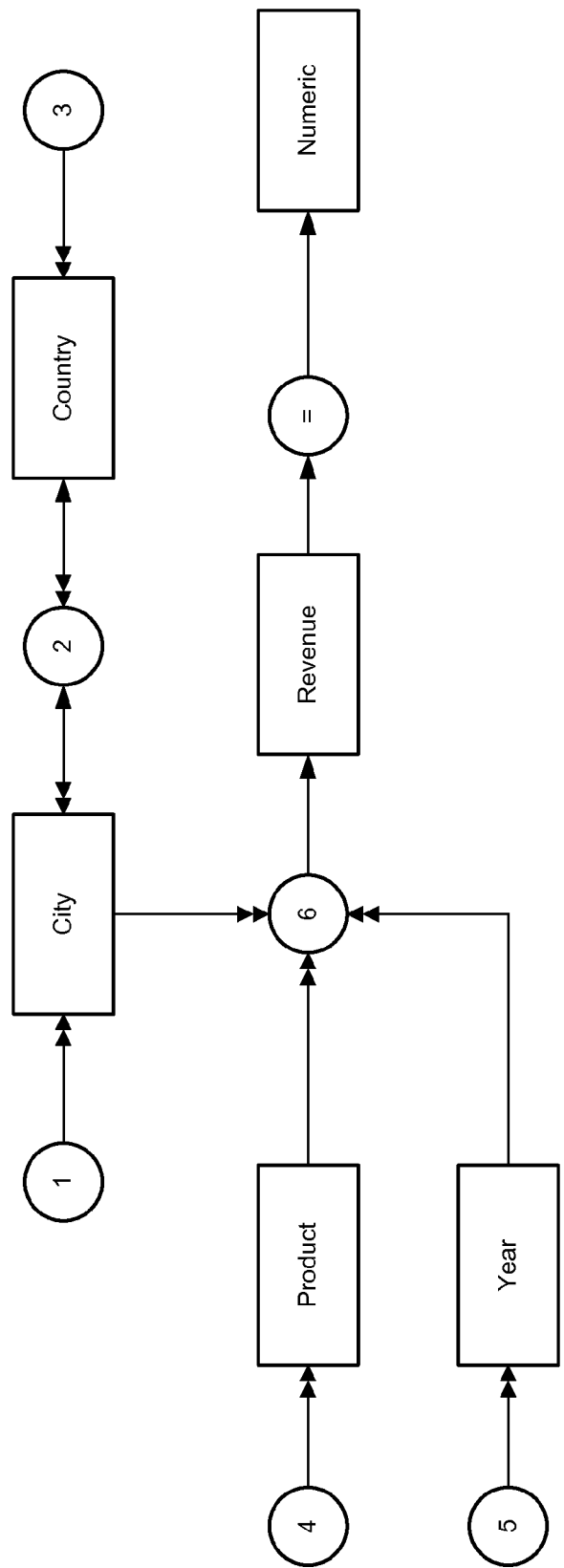
FIG. 5 is a diagram of a schema according to some embodiments.

FIG. 5 is a representation of a small schema that exposes a simple datamart. A circle represents a dependency, a rectangle denotes an attribute, and an arrow between a dependency and an attribute is an axis of the dependency. The type and orientation of arrows describe the cardinality and orientation of the axis.

The dependencies are labeled in FIG. 5 so as to be identifiable in the following description, but dependencies of an input schema are anonymous according to some embodiments. Consequently, a DaSL expression does not explicitly refer to any dependencies, but only to attributes.

Some of the dependencies in this example (i.e., 1, 3, 4, 5) only have an output axis (a set in this case). Such dependencies are called constant domains or domains.

Dependency 1, for instance, specifies that it is possible to obtain a constant set of values for the attribute City, i.e., a list of all cities, possibly extracted from some table in a relational database.

Dependency 2 exposes a relationship between the two attributes City and Country. Each of the two attributes is both an input and output of the dependency. City is a scalar input and set output of the dependency, and Country is a scalar output and set input of the dependency.

Accordingly, through dependency 2, one can compute a set of countries from a set of cities and, conversely, a set of cities from a set of countries. Additionally, dependency 2 indicates that, if at most one city is presented as its input, then at most one country is obtained as its output. The opposite is not true, since a single country may include several cities.

Dependency 6 exposes a fact table, which is a way of computing a value for the attribute Revenue from any combination of sets of values for the attributes City, Product and Year. Since dependency 6 has a scalar output and no scalar input, it will compute at most one value of Revenue for any combination of values of its inputs. Such a dependency may be referred to as an aggregating dependency.

The dependency labeled "=" relates the attribute Revenue to the attribute Numeric. This notation indicates that any value of the attribute Revenue is also a value of the attribute Numeric. Stated differently, Revenue is a numeric measure and any numeric operation is possible on it. Such a dependency is referred to as an identity (or typing) dependency.

Figure 6:
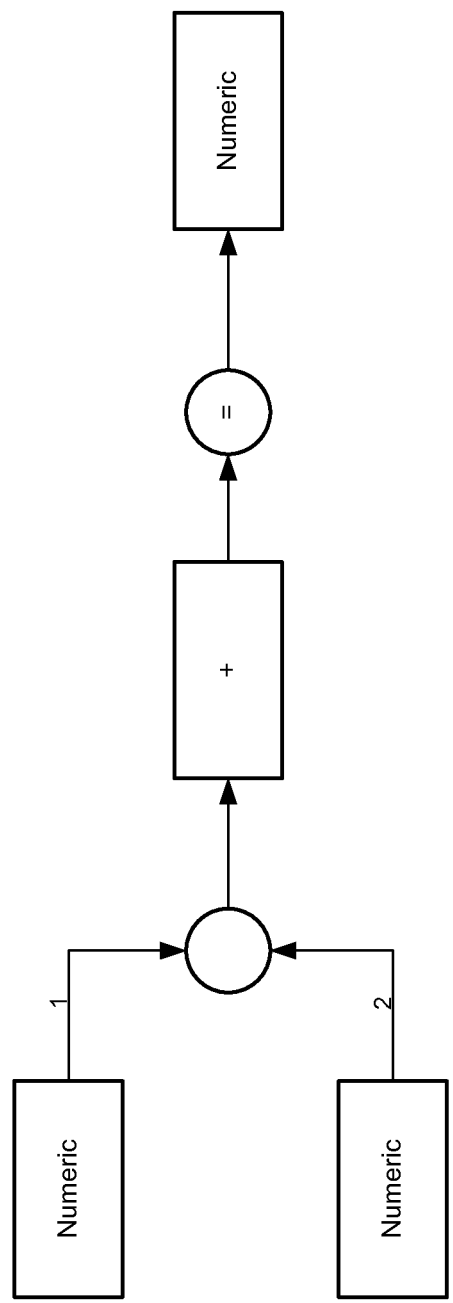
FIG. 6 is a diagram of a schema according to some embodiments.

All numeric operations such as "+", "*", etc. and, more generally, all predefined functions are also represented as dependencies. For instance, the operator "+" can be represented by the schema of FIG. 6. Therefore, even the operator "+" is seen as an attribute. A dependency may have several axes on the same attribute but such axes must be ordered in order to indicate which occurrence of the input attribute should be mapped to which of the input axes.

The axes of dependencies may be considered explicit, contextual, or optional. The explicit axes of a dependency (e.g., predefined operators or user-defined dependencies), if any, can be based on the same attribute, and they are ordered. An attribute that is the output of a unique dependency with explicit axes is called an explicit attribute. When an explicit attribute is computed, a matching value for each of the explicit axes of the dependency that defines it must be explicitly provided Contextual axes are the axes of a dependency that are not explicit. Although contextual axes can be specified explicitly in an attribute expression, the requested inputs can be automatically determined from the context even if these axes are not specified explicitly. If a dependency includes a pure output axis, then any contextual axis that is both an input axis and an output axis is referred to as an optional axis, and the set of values provided for this axis by the dependency is called an axis domain. It is possible to compute a value for the dependency's output without providing a value for its optional input, i.e., its axis domain may be used as a default input.

The type of a DaSL expression represents its topology, i.e., the structure of a data set represented by the expression. Constants or single attributes have simple types (e.g., their values may be retrieved from a simple table), but other expressions such as iterations or compounds can have fairly sophisticated topologies which a client tool can navigate to render data. Advantageously, one DaSL expression can represent any data set that would be materialized as a 3rd-normal form database schema. For instance, an expression such as:

{Revenue IN(Product, Customer), Inventory IN(Product, Warehouse)} represents a business question such as "Revenue per customer and inventory per warehouse split by products". This question would typically be represented by two fact tables, each with two dimension tables, and with one of the dimension tables being shared. This representation is considered as the type of this expression.

Figure 7:
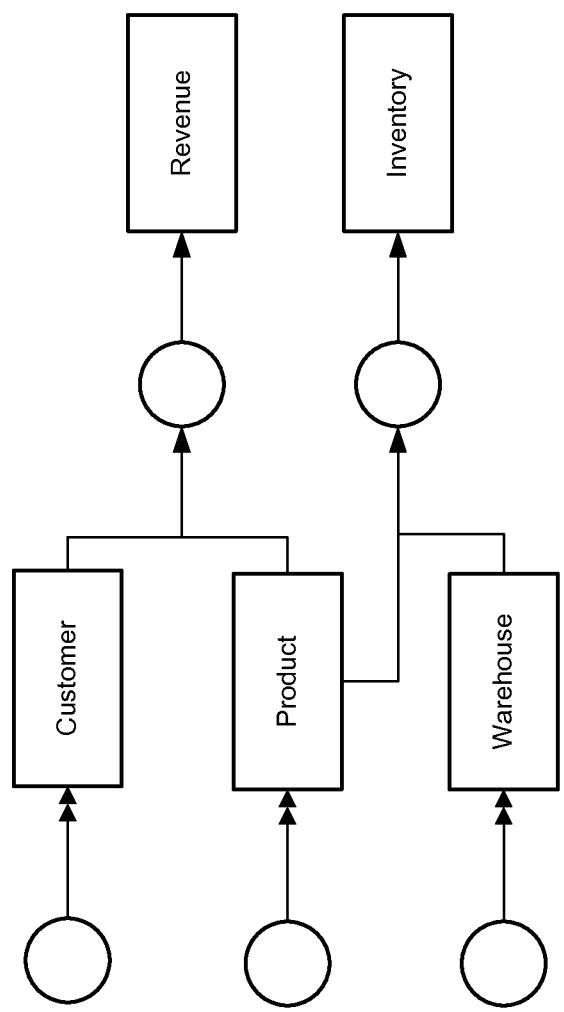
FIG. 7 is a diagram of an expression type according to some embodiments.

The type of an expression represents the topological structure of the data set that it represents, and is itself represented using a graphical notation. This notation shows what sets of values for which attributes exist in the specified data set, and how they can be retrieved from each other through input schema dependencies. For example, FIG. 7 shows the graphical notation of the type of the above expression.

Knowing an expression's type, a client tool can navigate the dependencies and attribute values that it produces or consumes. According to some embodiments, a set of cursors are associated to each output attribute of the expression, and the state of upstream cursors determines the set of values delivered by the downstream cursors to which they are connected. In the present example, five cursors would be created, three that independently iterate Customer, Product and Warehouse values, one that computes values for Revenue (a single value in this case) depending on the current Customer and Product, and one that computes a value for Inventory depending on the current Product and Warehouse.

Notably, the same graphical depiction is used for types of expressions as is used for input schemas. Accordingly, the type of an expression can be used to define a schema, called the expression schema, which in turn can be used as input schema to compute another expression. This "re-entrance" property is a basis for "schema modifiers" like the FROM operator, and may enable features such as what-if analysis. More specifically, each of the dependencies that appear in an expression's type, and that compute its inputs from its outputs, can be collected into a schema which can in turn, alone or in the conjunction with other dependencies in the input schema, be used to evaluate expressions.

A DaSL expression can yield a different result depending on the values of some attributes, called its input attributes. An expression's dimensionality refers to the set of attributes that can, directly or indirectly, influence the expression's value. A DaSL expression is computed in an "input context" that specifies which values must be used for the attributes in its dimensionality. This context may be specified explicitly, as in most languages, but may also be specified implicitly.

Apart from constants, the value of a DaSL expression depends on the sets of values associated to certain attributes. An attribute can influence the value of an expression if one can navigate from the attributes to the outputs of this expression along some dependency path.

For example, the expression City normally returns the set of all countries. However, by specifying a Country, one can restrict this set to only those cities in the specified Country. Conversely, the evaluation of a set of Countries can be influenced by a restriction on the set of Cities in these countries, so each of these attributes can be dimensioned by the other. Likewise, the attribute Revenue yields a numeric value that is influenced by attributes Product, City and Year and, more indirectly, by Country.

This also holds true for more complex expressions. For instance:

(Revenue/(Revenue FOR Country))IN City is a ratio calculation which, for each city, returns its relative contribution to the revenue of its country. This expression can be directly influenced by the attributes Product, Year, City and/or Country.

In an input schema according to some embodiments, it may be possible to find a path that relates two attributes in different and sometimes unexpected ways. In order to help users maintain a good understanding of the dimensionality of expressions, rules may be instituted to restrict how an attribute can indirectly influence another attribute. These rules are intended to prevent any counterintuitive behavior.

Three rules will now be described for preventing unexpected "cardinality explosion" in which an attribute cannot be indirectly dependent on another if there is not some kind of many-to-one relationship from one to the other. These rules are simply stated: No implicit use of measures; No implicit usage of shared properties; and No implicit sets for scalar-only attributes.

A measure or fact table is not implicitly used to relate two of its optional inputs. More generally, a dependency is always be used to determine its pure output if it has one, instead of a many-to-many relationship between two of its optional inputs. For instance, if the measure Sales has both Product and City as optional inputs, then it is possible to navigate from, for example, City towards Product through the dependency that computes Sales. However, City is not considered part of the dimensionality of Product, and an attribute expression like City.Product is not accepted. If the set of Products sold in a set of Cities is desired, it may be expressed explicitly as follows:

NonEmpty(Product, Sales FROM City←{"Paris", "NYC"})

Next, if two attributes A and B each have a scalar dependency on the same attribute S, and one of them is an input-output axis of its dependency on S, then one can navigate from one to the other through their common property. However, this is prohibited unless S is explicitly specified.

For example, a scenario is considered in which any Order specifies a Product, and—independently—any Component is part of one Product. Both dependencies can be navigated in either direction, so that one can compute the set of Orders for a given Product. Even though one could navigate from Order to Component via the shared property Product, this navigation is prohibited from being implicit. Order is not considered part of the dimensionality of Component, and an attribute expression such as Order.Component is rejected.

It is possible to compute the set of Components involved in the set of products of a set of orders, if done explicitly, as follows:

Order.Product.Component

Finally, if an attribute only appears as a scalar output in all dependencies that produce it in the input schema, then one cannot implicitly compute a non-scalar domain for it. For instance, if each Product has a Description and (as one would expect) there is no domain for Description in the input schema, then the expressions Description or even Product.Description will not compile, because they would implicitly create a set for an attribute which is only known as a scalar.

However, if there is only one Product in the current input context, for instance because we are iterating on a set of Product, then the expressions above may successfully compile since they don't change the cardinality of Description, which is still scalar. In this case, the following expression will also compile successfully:

(Sales, Description)IN Product

It is also possible to determine the set of all descriptions across all products explicitly, using the Set operator as follows:

Set(Description IN Product)

In most programming languages, an expression that is a function of certain parameters explicitly specifies the values for these parameters which are to be used when evaluating the expression. For instance:

Sales(City←"Paris", Year←"2010", Product)

will compute the sales for Paris in 2010, over all Products.

However, some embodiments also support a more indirect way of specifying the input values to be used for computing attributes. Unless an axis of a dependency is marked as explicit, in which case a value for it is explicitly supplied each time the output attribute is computed, some embodiments deduce the value to be used for any unspecified input of an expression.

For instance, in the following expression:

Sales(Year←"2010")IN Country the attribute Sales is determined as a function of Year, City and Product. However, in this example, only Year is specified. The values for the other two attributes may be determined implicitly. Specifically, since the attribute Sales is evaluated in the context of an iteration on Country, the compiler knows that a set of cities (i.e., the cities in the current country) is available in this context, and this set of cities is used. The compiler also uses the default value for Product because Product is an optional attribute of the dependency that defines Sales. If Product were not an optional attribute, then the set of all available Products would be used.

This knowledge of which set of values for each attribute is available to evaluate an expression is called the input context of the expression. It is possible to explicitly specify the input context of an entire expression using the FOR operator. It is also possible to name an input context and re-use it, which allows for "out-of-context" calculations such as ratios.

All DaSL expressions result in the computation of sets of values associated to attributes, based on sets of values for other attributes. Even a scalar expression, such as 2+3, computes a set of one value (4) for the attribute '+', based on two sets of values {2} and {3} for the predefined attribute Numeric.

When a set of values for an attribute can be guaranteed by the compiler to contain at most one value (zero or one) in a certain context, the set is called a scalar value (in this context). A scalar value is therefore a set that is guaranteed to be either empty or a singleton.

The scalar-ness property for an attribute depends on the topology of the dependencies that compute it, as well as its input context. Each dependency in an input schema may specify that some of its input or output axes are "scalar". If, in a given context, all values used as input for a scalar axis are scalar, then the value of any scalar output is scalar as well.

For example, if a measure like Revenue aggregates over the dimensions that govern it (e.g., City, Year and Product), the dependency that computes it has a scalar output axis and no scalar input axis. Accordingly, regardless of the sets of values which are available in the input context to compute Revenue, a scalar value (a single value or the empty set) will always be obtained.

If a measure such as Inventory aggregates over City and Product but not over Time, the dependency that produces it includes Inventory as a scalar output axis and Time as a scalar input axis. Accordingly, if a single Year is provided in the input context, then a scalar value is produced, but if multiple years are provided, the measure is no longer a scalar value. In this case, an expression is not compiled that would implicitly and silently return a set for an attribute that is meant as a scalar; it will demand that the set computation be explicit.

As a result of the foregoing, the following expressions will compile, since Year is a scalar in both input contexts where Inventory is computed:

Inventory FOR Year←2010

Inventory IN {Year←2010, Year←2011}

However,

Inventory FOR {Year←2010, Year←2011} will not compile, because it would "silently" return a set of values for Inventory rather than a scalar. Instead, set(Inventory IN {Year←2010, Year←2011})

will compile the set of distinct values for Inventory across the two years. This set will generally have two elements but could have only one if both years happened to have the same inventory level.

DaSL may be built around a small set of core concepts, embodied by a small set of core operators or syntactic constructs as shown in the table below. A given data source may not support all of these core primitives.

| Construct | Examples | Meaning |
| --- | --- | --- |
| Constant | "Hello World"; 42; TRUE; | A String, Numeric or Boolean constant |
| Attribute | Revenue; Product; City; [an attribute name]; [Dimension].[Hierarchy]; | A value or set of value attached to an attribute that represents some business entity or function |
| Attribute expression: . ( ) | City<-"LA".Revenue(Product<-"PC") | computing attributes from each other |
| Value Selection: ← | Product<-"TV" | Intersects the values of an attribute with another set of values |
| Input specification: FOR | (Sales-Cost) FOR Year<-(2010,2011) | Computes an expression for specified set of values |
| Iteration: IN | (Sales-Cost) IN Year<-(2010,2011); Sales IN (City,Product); (Sales IN City) IN Country; | evaluates an expression for each combination of specified sets of values |
| Definition: AS | Margin AS Revenue - Cost; Double(X:Numeric) AS X*2; | Defines a dependency |
| Merged expression: (,) | ( City."Paris", City."Berlin"); ( City, Country ) | Merges several expressions into one (e.g. a set). |
| Subquery: FROM | Margin FROM MERGE (Margin AS Revenue-Cost); | Evaluates an expression using a schema defined by another expression (subquerying) |
| Named context or "label": ':' | Here:((Sales/Here.Sales) IN City) | An attribute naming an input context |
| Ordered expression: '::' | (Revenue IN City)::City.ASC; | Specifies an order for iterations |
| Set( ) | set(Population IN Country) Avg(Population IN Country) | Retrieves the set of all distinct values brought back by an iteration |
| Tuples( ) | tuples(City In Country) | Retrieves the set of all distinct tuples enumerated by an iteration |
| Control structure: IfExists | IfExists((Revenue>10)←TRUE, "good") | Yields an expression if another is not empty. The basis of all control structures. |
| NonEmpty | NonEmpty(City,Revenue) | Select input values that generate non-empty output values. The basis of filters. |

Useful constructs may also be derived from the core primitives and offered as helpers to facilitate the authoring of DaSL expressions. The following table describes some of such helpers according to some embodiments.

| | | |
|---|---|---|
| Compound expression: (,) | (City<−"LA",Product<−"TV"); (Revenue, Cost IN City); | Groups several expressions into a single unit (e.g. a tuple). Each component can be retrieved. |
| Augmented schema: WITH | WITH ((Sales AS 10) IN (City AS 'Oz')) Revenue IN City | Merges an expression's schema into the current schema |
| Control structure: IF, CASE | If (Revenue >10) "good" SWITCH(Revenue) Case(0..10): small, Default: large | Yields an expression if another is not empty. |
| The Filter operator | Filter(City, Revenue>10) | Filters a set through an expression |
| Calculated members | MEMBER(City,'Oz',(Revenue AS 10)) Rollup(City,'All) | Extends a schema or domain with new members and dependencies. |
| Non-empty iteration: INNE | Revenue INNE (Product,City) | Iterates an expression only on axis values that generate a non-empty value |

Now will be described several advantageous examples of DaSL expressions according to some embodiments.

DaSL expressions may compute an arbitrarily complex data set in one pass. For instance, assuming that a schema provides Revenue information per Year, City and Product, as well as inventory information per Product and Warehouse, then the following expression:

(Revenue INNE City, Inventory INNE Warehouse)IN Product will retrieve a sectioned report (or a parameterized dashboard) which, for each Product, contains two independent tables (one for Revenue per city, one for Inventory per Warehouse). This expression will be compiled and computed as one unit, and the resulting data set will contain a stand-alone dimension table for Product, two dimension tables for City and Warehouse, each of which contains a foreign key to Product; and tow fact tables, one with foreign keys on City and Product, and one with foreign keys on Warehouse and Product. These tables can directly be used by a client application to, for example, display a report or dashboard.

In the following example:

{Revenue IN(City, Product), Inventory IN(Warehouse, Product)}, the schema retrieved has three independent dimension tables and two fact tables, each of which shares the dimension table for Product but not the other dimension tables. Such schemas cannot be retrieved using conventional query languages.

In another example, the DaSL expression:

Margin AS(Revenue−Cost)

obtains a single figure that represents the (overall) margin. This expression could also temporarily be added to the DaSL input schema, in the scope of a query, and used in multiple ways, for instance:

WITH (Margin AS Revenue − Cost) (
    Margin IN Product,
    Margin IN Customer,
    Margin
)

A DaSL expression or calculation is understood as a definition if specified without the trailing semi-column. This definition can be compiled on its own, stored, and inserted in an input schema supplied to other sessions. For example, Margin AS Revenue−Cost does not compute anything, but creates a definition for Margin that can then be added to an input schema. Users of this augmented schema—in a different session—will be able to use the measure Margin without knowing whether it is natively stored in the database or has been logically defined.

Since the two query and authoring expressions are almost identical, a knowledgeable business user can easily test a calculation and publish it as a definition without having to rely on IT support.

Moreover, any calculation involving the definition will correctly take into account the dimensional context. In the above example, the definition will carry the knowledge that Margin depends on Customer and Product, and will correctly compile any calculation depending on possible restrictions applied to those dimensions.

Complex schemas, and not only scalar computations, can be defined, stored and re-used. Expressions can be parameterized, causing parameters to be provided when the authored expression is re-used in a future session. For instance, the following expression develops and tests a "sales paretto" table, that can be re-used in other contexts:

Paretto(N:Numeric)AS((Sales FOR top(Customer:: Revenue.ASC, N)/Sales)IN Year)

This expression computes the percentage of sales coming from the top N largest customers, across the years. When the expression is used, the DaSL compiler ensures that a proper numeric value for N is supplied.

In yet another example, new dimensions and dependencies therebetween can be easily authored. For instance, the expression:

Revenue IN set((Customer.Age % 10)IN Customer)

directly specifies a histogram of Revenue generated by the different age groups of customers. Likewise, the expression:

WITH(Points AS set((Revenue, Population)IN City))

(Count(City)FOR Points←Revenue←Population)

IN(Points.Revenue, Points.Population)

returns a data set ready to be displayed in a two-dimension scatterplot. Conventional query languages are unable to provide this easy-to-use functionality.

Another powerful feature of some embodiments is the ability to merge several data schemas into a single schema using a merge operator. The merge operator may be used in a wide variety of applications that either have no equivalent or would require intricate expressions in SQL or MDX.

The syntax of the merge operator is {E1, ..., En} where E1, ..., En are arbitrary DaSL expressions that each represent a schema. The output is a single, merged schema.

{City('Oz')→Population(100), Population IN City} implements a simple calculated member. It returns one new dimension table for cities and one new fact table for Population, each of which would be obtained in SQL by two independent UNION expressions, and would therefore require independent SQL expressions. In MDX, such a calculated member can be expressed using an ad-hoc mechanism with completely hard-wired semantics.

The aforementioned expression:

{Revenue IN(City, Product), Inventory IN(Warehouse, Product)} merges two schemas and shares their common dimension table on Product, an operation that can't be done using SQL or MDX.

In addition, the expression:

{Revenue IN City, Revenue IN Product} merges two tables into a two-dimensional crosstab that returns Revenue for any pair of City and Product.

Figure 8:
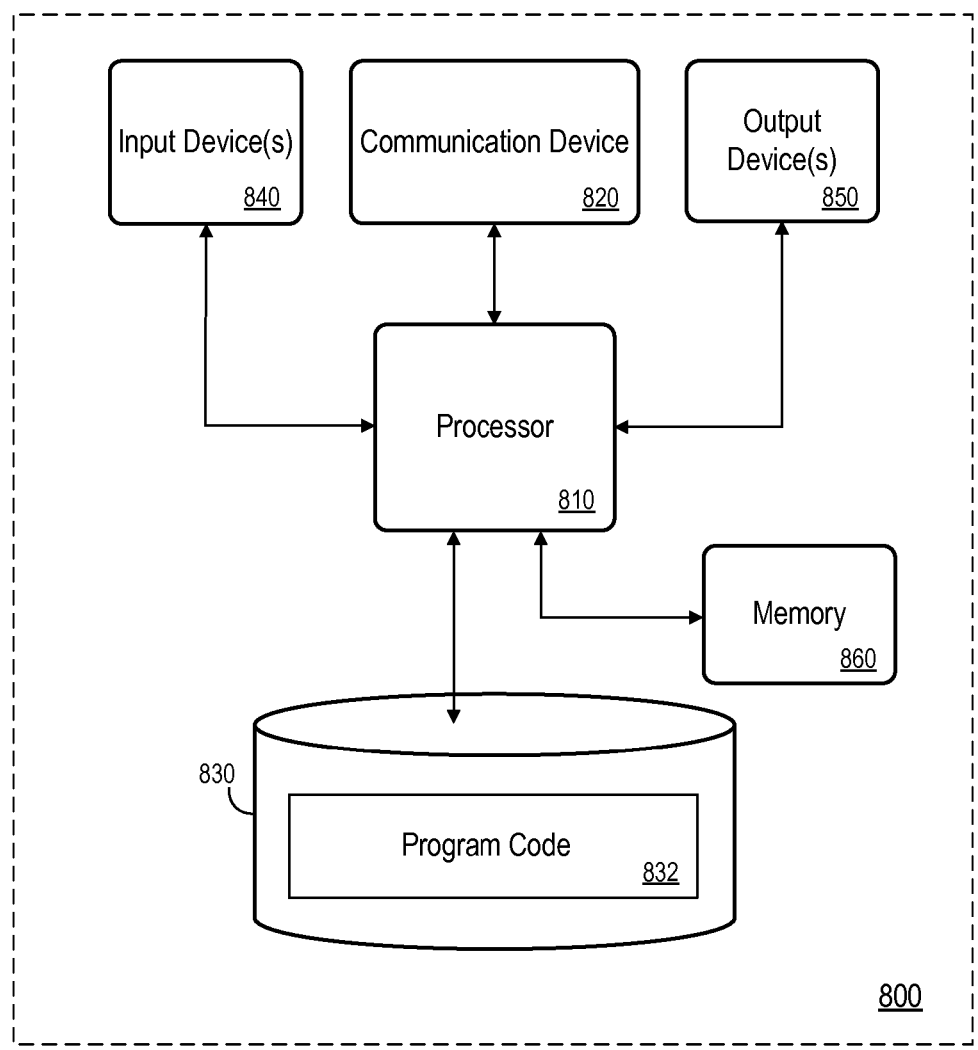
FIG. 8 is a block diagram of an apparatus according to some embodiments.

FIG. 8 is a block diagram of apparatus 800 according to some embodiments. Apparatus 800 may comprise a general-purpose computing apparatus and may execute program code to perform any of the functions described herein. Apparatus 800 may comprise an implementation of application server 320. Apparatus 800 may include other unshown elements according to some embodiments.

Apparatus 800 includes processor 810 operatively coupled to communication device 820, data storage device 830, one or more input devices 840, one or more output devices 850 and memory 860. Communication device 820 may facilitate communication with external devices, such as a reporting client, or a data storage device. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into apparatus 800. Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM).

Program code 832 may be executed by processor 810 to cause apparatus 800 to perform any one or more of the processes described herein. Embodiments are not limited to execution of these processes by a single apparatus. Data storage device 830 may also store data and other program code for providing additional functionality and/or which are necessary for operation thereof, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of the discussed architectures may include a processor to execute program code such that the computing device operates as described herein.

All systems and processes discussed herein may be embodied in program code stored on one or more non-transitory tangible computer-readable media. Such media may include, for example, a floppy disk, a CD-ROM, a DVD-ROM, a Flash drive, magnetic tape, and solid state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A non-transitory computer-readable medium storing program code, the program code executable by a processor of a computing system to cause the computing system to:
   receive a logical schema associated with a data store;
   generate an input schema based on the logical schema;
   receive an expression having a type of the input schema and representing the topology of a data set, the data set being an instance of the input schema;
   compile the expression to a data specification based on the input schema;
   generate a plan to execute on the data store based on the data specification;
   transmit the input schema to a client device;
   receive the expression from the client device;
   generate the type of the expression based on the expression; and
   transmit the type of the expression to the client device.

2. A non-transitory computer-readable medium according to claim 1, wherein the input schema comprises only attributes related by associated dependencies,
   wherein a dependency represents a relation or constraint between sets of values of its associated attributes.

3. A non-transitory computer-readable medium according to claim 1, the program code further executable by a processor of a computing system to cause the computing system to:
   receive a second logical schema associated with the data store; and
   generate the logical schema based on the second logical schema.

4. A non-transitory computer-readable medium according to claim 3, wherein the input schema comprises only attributes related by dependencies,
   wherein a dependency represents a relation or constraint between sets of values of its associated attributes.

5. A non-transitory computer-readable medium according to claim 1, wherein the topology of the data set comprises two fact tables and two or more independent dimension tables, and wherein the two fact tables share a first at least one of the two or more dimension tables and do not share a second at least one of the two or more dimension tables.

6. A computer-implemented method comprising:
   receiving a logical schema associated with a data store;
   generating an input schema based on the logical schema;
   receiving an expression having a type of the input schema and representing the topology of a data set, the data set being an instance of the input schema;

compiling the expression to a data specification based on the input schema;
generating a plan to execute on the data store based on the data specification;
transmitting the input schema to a client device;
receiving the expression from the client device;
generating the type of the expression based on the expression; and
transmitting the type of the expression to the client device.

7. A method according to claim 6, wherein the input schema comprises only attributes related by associated dependencies,
   wherein a dependency represents a relation or constraint between sets of values of its associated attributes.

8. A method according to claim 6, further comprising:
   receiving a second logical schema associated with the data store; and
   generating the logical schema based on the second logical schema.

9. A method according to claim 8, wherein the input schema comprises only attributes related by dependencies,
   wherein a dependency represents a relation or constraint between sets of values of its associated attributes.

10. A method according to claim 6, wherein the topology of the data set comprises two fact tables and two or more independent dimension tables, and wherein the two fact tables share a first at least one of the two or more dimension tables and do not share a second at least one of the two or more dimension tables.

11. A system comprising:
    a data storage device storing data;
    a computing device comprising:
       a memory storing processor-executable program code; and
       a processor to execute the processor-executable program code in order to cause the computing device to:
          receive a logical schema associated with a data store;
          generate an input schema based on the logical schema;
          receive an expression having a type of the input schema and representing the topology of a data set, the data set being an instance of the input schema;
          compile the expression to a data specification based on the input schema; and
          generate a plan to execute on the data store based on the data specification;
          transmit the input schema to a client device;
          receive the expression from the client device;
          generate the type of the expression based on the expression; and
          transmit the type of the expression to the client device.

12. A system according to claim 11, wherein the input schema comprises only attributes related by associated dependencies,
    wherein a dependency represents a relation or constraint between sets of values of its associated attributes.

13. A system according to claim 11, the processor to further execute the processor-executable program code in order to cause the computing device to:
    receive a second logical schema associated with the data store; and
    generate the logical schema based on the second logical schema.

14. A system according to claim 13, wherein the input schema comprises only attributes related by dependencies,
    wherein a dependency represents a relation or constraint between sets of values of its associated attributes.

15. A system according to claim 11, wherein the topology of the data set comprises two fact tables and two or more independent dimension tables, and wherein the two fact tables share a first at least one of the two or more dimension tables and do not share a second at least one of the two or more dimension tables.

* * * * *